United States Patent [19]

Hutson et al.

[11] 3,898,626

[45] Aug. 5, 1975

[54] DATA PROCESSING APPARATUS

[75] Inventors: Maurice L. Hutson; Lewis R. Bethany, both of St. Paul, Minn.

[73] Assignee: Control Data Corporation, Minneapolis, Minn.

[22] Filed: Mar. 13, 1974

[21] Appl. No.: 450,632

[52] U.S. Cl. .......... 340/172.5; 340/172.5

[51] Int. Cl.[2] .......... G06F 7/00; G06F 13/00

[58] Field of Search .......... 340/172.5

[56] References Cited

UNITED STATES PATENTS

| | | | |
|---|---|---|---|
| 3,346,727 | 10/1967 | Lethin et al. | 340/172.5 |
| 3,728,684 | 4/1973 | Morganti | 340/172.5 |
| 3,735,359 | 5/1973 | Wagner | 340/172.5 |
| 3,761,880 | 9/1973 | Kritz et al. | 340/172.5 |
| 3,764,986 | 10/1973 | Spademan et al. | 340/172.5 |

*Primary Examiner*—Gareth D. Shaw
*Assistant Examiner*—Michael C. Sachs
*Attorney, Agent, or Firm*—Robert M. Angus

[57] ABSTRACT

Buffer apparatus is provided between the memory and calculator portions of a computer to selectively buffer vectors for optimum system timing. The first arriving of a plurality of operand vectors are stored in the buffer until the later arriving vector arrives, at which time both vectors are forwarded to the calculator portion. The buffering also accepts operands to compensate for system timing. Upon return of the resultants, the resultant vector is selectively buffered to assure proper storage of the resultant vector without adversely affecting reading of the operand vectors. Also, to optimize timing and minimize equipment and delays, control apparatus is provided to selectively additionally buffer operand vectors depending upon the time of arrival of the resultant vector.

12 Claims, 10 Drawing Figures

DATA PROCESSING APPARATUS

This invention relates to data processing, and particularly to apparatus for processing data and information between various portions of a computer or the like.

In the data processing art, it is often desireable to move relatively large quantities of data between portions of the computer in the shortest amount of time. For example, data stored in memory is ordinarily read from the memory banks in succession for subsequent operation in the calculator portions of the computer. However, situations arise where it is desirable to operate on data representing different operands which are stored in the same or adjacent memory banks. Further, it is often desirable to store data representing a resultant in the same or adjacent memory banks.

Vector operations are operations performed by a computer in which individual ones of a plurality of operands representing one vector are sequentially processed with individual ones of a plurality of operands representing another vector to obtain a plurality of resultants representing a third vector. For example, a simple vector $A + B = C$ comprises successive operations of $A_1 + B_1 = C_1$, $A_2 + B_2 = C_2$, $A_3 + B_3 = C_3 \ldots A_n + B_n = C_n$, where $A_1, A_2, A_3 \ldots A_n$ comprise the vector A; $B_1, B_2, B_3 \ldots B_n$ comprise the vector B; and $C_1, C_2, C_3 \ldots C_n$ comprise the resultant vector C. Ordinarily, prior to computation of the vector problem, the vector A comprising $A_1, A_2, A_3 \ldots A_n$ is stored in successive ones of a plurality of banks of the memory. Vector B comprising $B_1, B_2, B_3 \ldots B_n$ is stored in successive banks of the memory, and the resultant vector C comprising $C_1, C_2, C_3 \ldots C_n$ is to be stored in a plurality of banks of the memory. Often, the banks in which vectors A and B are stored, are the same, or overlapping, and the resultant vector C is to be stored in the same or overlapping banks of the memory as the operand vectors.

Ordinarily, the read/write circuits of a memory are capable of accessing only one block of data from a memory bank during a particular time. Therefore, it is not possible to simultaneously read A and B operands from a single memory bank, nor to store a C resultant in the same memory bank during a single major cycle of the memory bank.

Heretofore, when A and B operands appear in the same memory bank, the operand appearing first had to be delayed by a predetermined time until the operand appearing second was read out. For example, and with reference to FIG. 1, A and B vectors are stored in the same bank of the memory; $A_1$ through $A_8$ being stored as a superword (sword) in bank 1; $A_9$ through $A_{16}$ being stored as a sword in bank 2; etc.; $B_1$ through $B_5$ being stored in a sword in bank 1; $B_6$ through $B_{13}$ being stored as a sword in bank 2; etc. It has been the practice in prior computers to first read the $A_1$ operand from bank 1. The $A_1$ operand is then delayed until $B_1$ is read and $A_1$ and $B_1$ are moved onto the calculating portions of the computer to obtain $C_1$. The B operands are then delayed until $A_2$ is read. The A operands are then delayed until $B_2$ is read. The process continues with a delay occurring after each successive read of an operand, thereby resulting in significant delays.

Further, and as will be more fully understood hereinafter, additional delays occurred upon writing the resultant C data back into the same memory banks.

Most memories are capable of accessing operands successively from several banks during a single major cycle of the memory. For example, and with reference to FIG. 1, up to eight consecutive banks may be accessed during a major cycle. However, only operands of one vector may be accessed from the several banks, and it is not possible to read A operands from one of the group of eight banks and B operands from another of the same eight banks during a single major memory cycle.

It is an object of the present invention to provide apparatus which accomplishes a single delay for the entire vector so that successive delays of individual operands do not occur.

Another object of the present invention is to provide apparatus for acquiring data from the memory of the computer in a minimum period of time, and to write data into the memory in a minimal time.

In accordance with the present invention, data representing at least two pluralities of operands to be forwarded to the arithmetic or calculating portions of the computer are channeled through a selective buffer. The first arriving data is delayed until the second data is ready to be read. The buffer continuously stores the successively arriving data of the first vector and reads out such data on a first in, first out basis coincident with corresponding data from the second vector. For example, and with reference to the example described above wherein each sword in a memory bank may include up to eight operands, the first read operands (i.e. $A_1$ through $A_8$) are stored in the operand buffer. Since the first B operand ($B_1$) is stored in the same bank as $A_1$ through $A_8$, $B_1$ is not read until all A operands ($A_1$ through $A_{64}$) are read from the first eight banks during the first major memory cycle. Thereafter, the read circuits simultaneously scan the first and ninth banks to successively read $A_{65}$ through $A_{72}$ operands from the ninth bank, and $B_1$ through $B_5$ (or up to 8) operands from the first bank. The buffer, meanwhile, sequentially releases $A_1$ et seq as $B_1$ et seq are read, while it stores $A_{65}$ et seq. Thus, $A_1$ and $B_1$ are released, followed by $A_2$ and $B_2$, etc.

One feature of the present invention resides in the provision of control means responsive to the first arriving data to buffer that data.

Another feature of the present invention resides in the provision of control means for selectively delaying the resultant data to be read back into the memory.

Yet another feature of the present invention resides in the provision of the control means between the two buffers to advantageously delay data streams by an optimum amount so that operands from the memory and resultants to the memory are transferred in a minimal time.

The above and other features of this invention will be more fully understood from the following detailed description and the accompanying drawings, in which.

Figure 1:
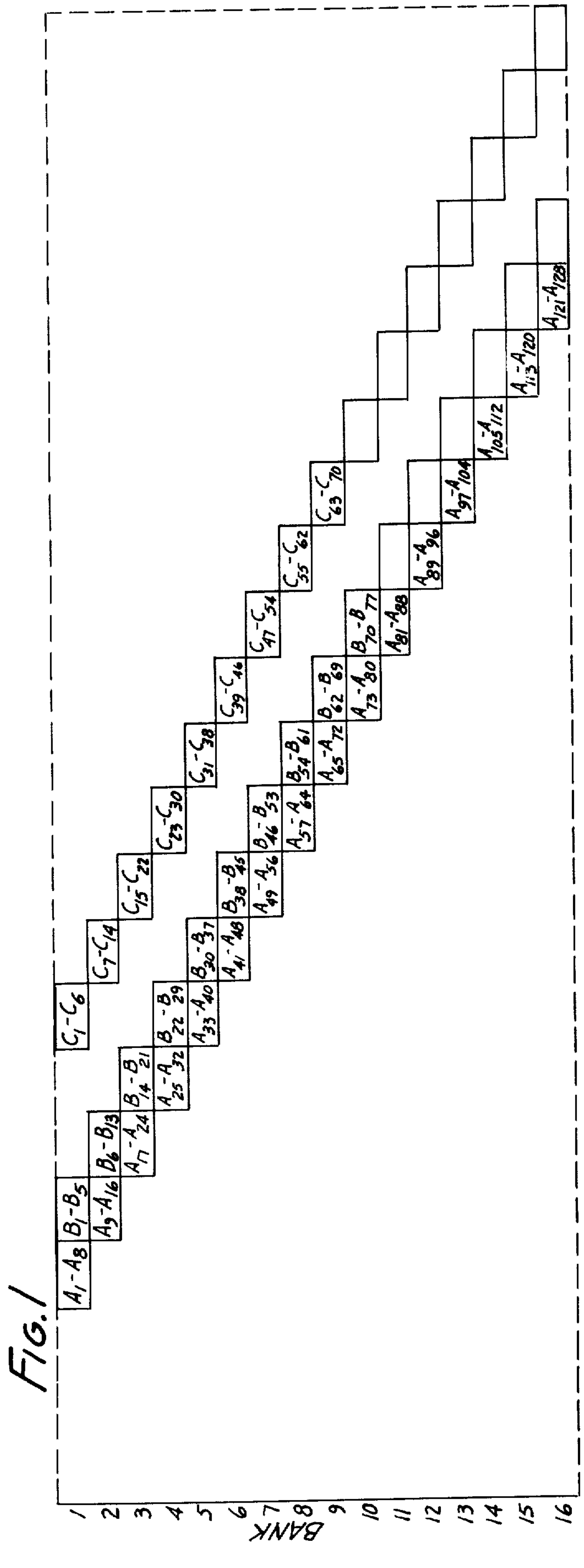
FIG. 1 is a representation of a location of storage of operand vectors A and B and of resultant vector C in a plurality of memory banks of a computer.

Referring to the drawings, and particularly to FIG. 1, ere is illustrated a typical arrangement of storage ta in a plurality of banks of a memory of a computer. s shown in FIG. 1, a plurality of vectors, designated and B each consist of a plurality of individual oper-ds $A_1, A_2, A_3 \ldots A_n$ and $B_1, B_2, B_3 \ldots B_n$. Each oper-d is sometimes called a "word" and each group of erands is sometimes called a "superword" or word". For the purposes of explanation, it is pre-med that each successive sword of each vector is ored in successive locations of the memory, and that ch bank of the memory is capable of storing one ord of an individual vector. Thus, as shown in FIG. bank 1 of the memory contains operands $A_1$ through $_8$, bank 2 of the memory contains operands $A_9$ rough $A_{16}$, etc. Further bank 1 of the memory also ntains operands $B_1$ through $B_5$ (the forward three po-tions being vacant), bank 2 of the memory contains erands $B_6$ through $B_{13}$, etc. As will be more fully un-erstood hereinafter, the resultant vector C is to be ored in such a manner that resultants $C_1$ through $C_6$ e stored in bank 1 (the forward two regions being va-ant), $C_7$ through $C_{14}$ are to be stored in bank 2, etc. he vacant regions are shown only to illustrate that ch vacancies can occur, and the number of vacancies ay be any number between 0 and 7 for the present ex-mples.

Figure 2:
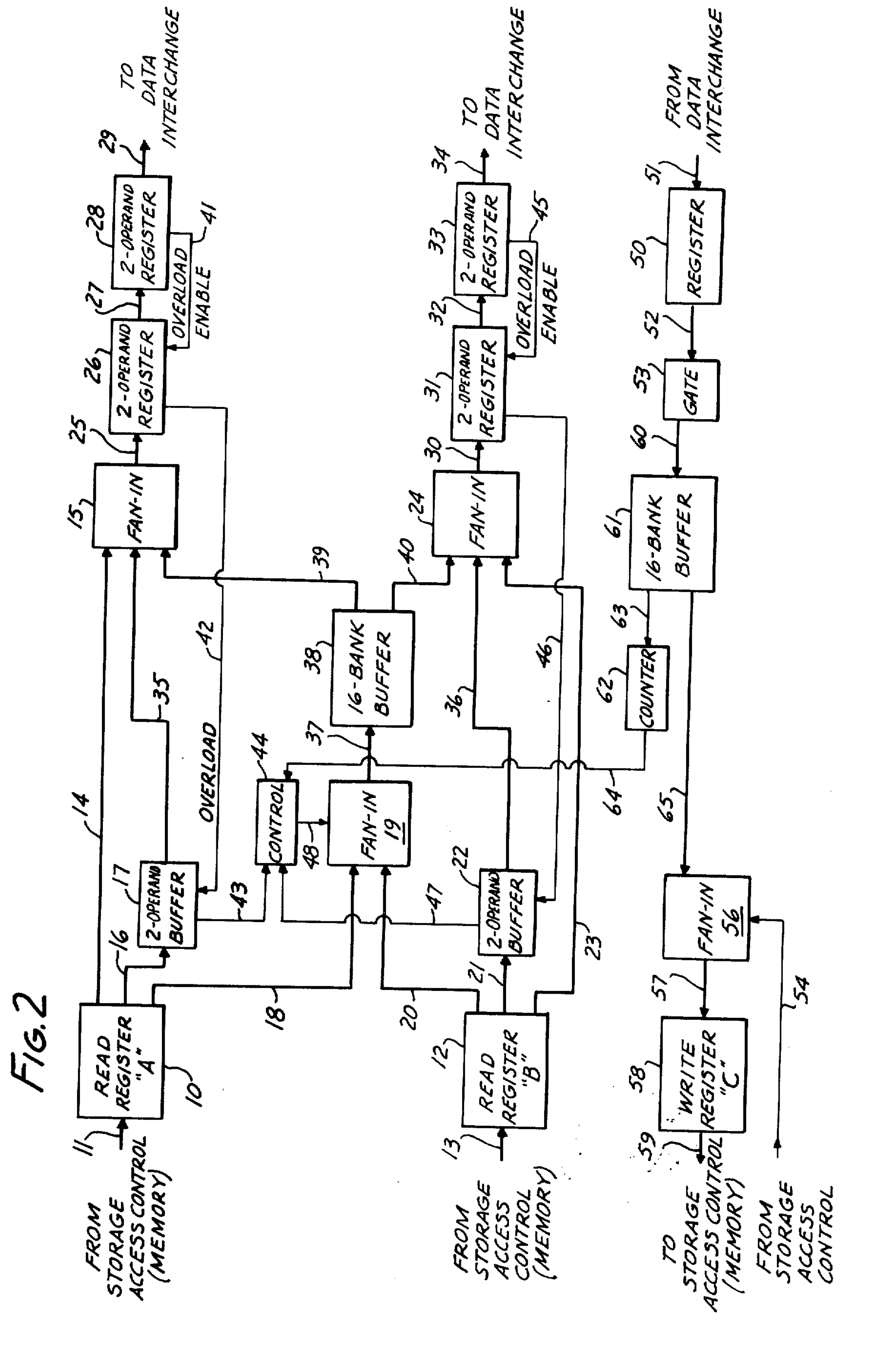
FIG. 2 is a block circuit diagram of a buffering control apparatus in accordance with the presently preferred embodiment of the present invention.

The apparatus for accomplishing such data channel-g in an optimum manner is shown in FIG. 2. FIG. 2 lustrates a block circuit diagram of a buffer and con-ol system in accordance with the presently preferred mbodiment of the present invention. The apparatus hown in FIG. 2 includes a read register 10 having an put via channel 11 from the storage access control of e memory of the computer. Likewise, a similar read egister 12 receives its input via channel 13 from the torage access control of the memory of the computer. egisters 10 and 12 receive separate operands A and . Read register 10 has an output channel 14 to fan-in ircuit 15, an output channel 16 to two-operand ¼-sword) buffer 17 and an output channel 18 to fan-in ircuit 19. Likewise, read register 12 has an output hannel 20 to fan-in circuit 19, an output channel 21 o two-operand (¼-sword) buffer 22 and an output hannel 23 to fan-in circuit 24. Fan-in circuit 15 pro-ides an output via channel 25 to two-operand (¼ word) register 26 which in turn provides an output via hannel 27 to two-operand (¼-sword) register 28. Reg-ster 28 provides an output via channel 29 to the data nterchange and calculator portions of the computer. ikewise, fan-in circuit 24 provides an output via chan-el 30 to two-operand (¼-sword) register 31 which in urn provides an output via channel 32 to two-operand ¼-sword) register 33. The output from register 33 is onnected to the data interchange and calculator por-ions of the computer via channel 34. Buffer 17 pro-ides an output via channel 35 to fan-in circuit 15 while uffer 22 provides an output via channel 36 to fan-in ircuit 24. Fan-in circuit 19 provides an output via hannel 37 to buffer 38 which is a 128-operand (six-teen-bank) buffer having outputs via channels 39 and 40 to fan-in circuits 15 and 24, respectively.

In FIG. 2, the heavy lines represent the possible paths that data representing the A and B operands may take, while the more narrow lines represent control lines. As shown in FIG. 2, an overload or enable control 41 is provided between register 28 and 26, an overload con-trol 42 is provided between register 26 and buffer 17, and an overload control 43 is provided between buffer 17 and control unit 44. Similarly, an overload control 45 is provided between registers 33 and 31, an overload control 46 is provided between register 31 and buffer 22, and an overload control 47 is provided between buffer 22 and control 44. Control 44 provides a control output 48 to fan-in circuit 19.

The apparatus as thus far described is capable of buffering data read from the memory. Particularly, and although the operation will be more fully described hereinafter, if the A vector data commences arriving first, the first several operands are channeled towards the data interchange via channel 14. Since the data in-terchange has not, as yet, received the first operand from the B vector ($B_1$), up to the first two operands (operands $A_1$ and $A_2$) are stored in register 28. If oper-and $B_1$ has not yet arrived, the data interchange is not ready to accept the A operands. Consequently, an overload signal is forwarded via channel 41 to register 26, advising that register to forward no further oper-ands to register 28. Consequently, up to the next two operands (operands $A_3$ and $A_4$) are stored in register 26. If the $B_1$ operand has not yet arrived, and register 26 is now fully loaded, an overload signal is forwarded via control 42 to buffer 17. Buffer 17 is then operated and the next two operands (operands $A_5$ and $A_6$) are forwarded to buffer 17. Upon fully loading of buffer 17, control 44 is operated via channel 43 to operate fan-in circuit 19 to accept all further A data. All further A op-erands are then forwarded through fan-in circuit 19 to buffer 38.

When the first B operand arrives, it is forwarded via channel 23 through fan-in circuit 24 to register 33. The data interchange, now capable of accepting the $A_1$ and $B_1$ operands, permits output of those operands from registers 28 and 33. When an operand has been moved to the data interchange, the space thus read is then filled with the next operand. Simultaneously, further A operands are being forwarded into buffer 38 as oper-ands are cleared from buffer 17 and subsequently read from buffer 38. The process continues until all A and B operands are read from memory.

The term "major cycle", as used herein, is the time associated with a single memory bank during which that bank may fulfill a request to either supply oper-ands or store resultants. When a request is made to a bank, that bank cannot again be accessed until comple-tion of the major cycle. With reference particularly to FIG. 1, several banks can be sequentially accessed so that the desired operands associated with one vector will be streamed in consecutive order. For the purposes of the present description, up to eight banks may be se-quentially accessed during the equivalent time of a major cycle for any one of them. Therefore, it is evi-dent that the first-accessed bank can be re-accessed only after completion of its major cycle, which, coinci-dently is the time necessary for accessing the first eight banks. Therefore, if a bank containing both A and B operands is accessed for A operands, the B operands are not read until completion of the first major cycle, and after A operands $A_1$ through $A_{64}$ have been read from banks 1 through 8. Therefore, the A operands $A_1$ through $A_{64}$ are buffered. Subsequently, the next A operands $A_{65}$, etc. are read from the ninth bank of the memory and are buffered in buffer 38, while simultaneously the B operands $B_1$, etc., are read from the first bank. As the first B operands are processed through the buffer for continuous data streaming towards the data interchange and calculator portions of the computer, the first A operands are read out of the buffer.

While the foregoing has been explained in connection with the situation where A operands arrive first, it is evident that if the B operands should arrive first, the process is similar except that the B operands are stored in buffer 38 until the A operands arrive and are processed. In this respect, control 44 determines the input and output controls for fan-in circuit 19 and buffer 38 based on which vector commences arriving first.

As shown in FIG. 2, resultant data from the data interchange is received by register 50 via data channel 51 and is forwarded via channel 52 through gate 53 to buffer 61. If the bank of the memory to which the resultants are to be stored is free, the storage access control provides an enable signal via control channel 54 so that the data may be channeled through fan-in circuit 56 for forwarding via channel 57 to write register 58 and thence to the storage access control via channel 59. If, however, the first memory bank is still active (such as if it is still reading data from either A or B operands) fan-in circuit 56 is not enabled, and the resultant C data is buffered in buffer 61. Buffer 61, which is capable of storing up to 128 resultants (sixteen banks), operates counter 62 via control channel 63 to count the number of resultant swords being stored in buffer 61. The output from counter 62 is forwarded via control channel 64 to control 44 for purposes to be hereinafter explained. Buffer 61 provides an output via data channel 65 to fan-in circuit 56 so that the data in buffer 61 may be written into memory when the applicable memory bank is free to accept it.

Figures 3B, 3C, 3D:
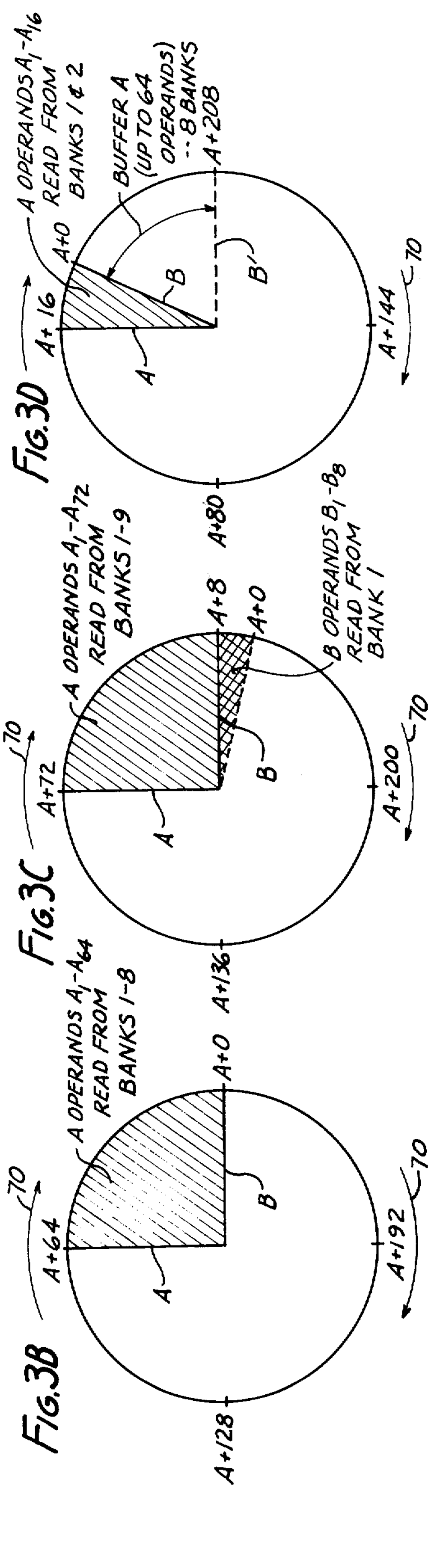
FIGS. 3A–3D are graphical representations illustrative of the operation of the buffering control apparatus shown in FIG. 2 for channeling operand vectors from əmory to the calculator portions of the computer; d
Figure 3A:
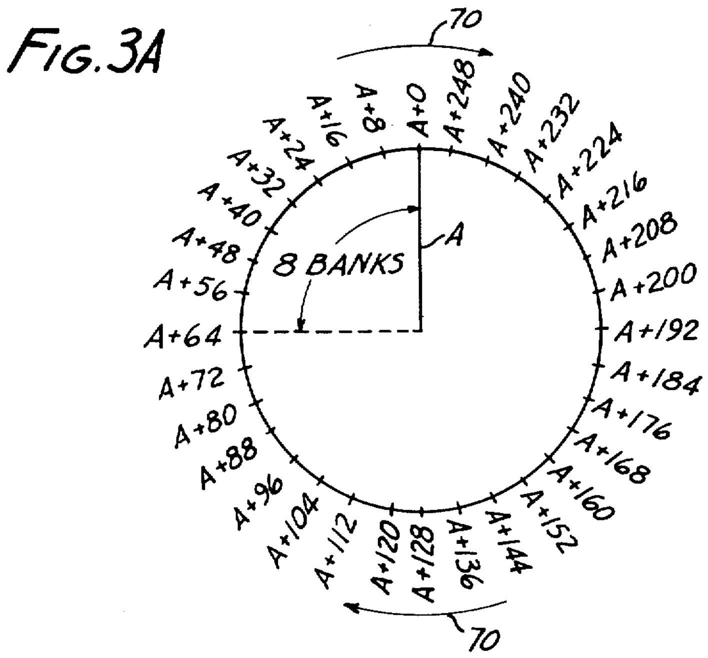

FIGS. 3A–3C are graphical representations illustrating the manner of operation of the buffer in connection with data being read out of memory. With reference to FIG. 3A, let it be assumed that the A vector arrives first. FIG. 3A shows a circle segmated into 32 euqal parts, each commencing with a designation A + 0 through A + 31, consecutively. The areas of each segment of the circle represents the operands in a single bank of the memory (sword); each quadrant representing eight banks of the memory which can be accessed during a single major cycle. For the purposes of explanation, let it be assumed that a sword (eight operands) may be read during four minor cycles of the computer, and that eight swords may be read during one major cycle. Thus, 32 minor cycles represent a quadrant of FIG. 3A, and comprise a major cycle of the memory.

Although not necessary for purposes of explanation herein, the 32nd or last minor cycle of a particular major memory cycle may also be utilized for addressing the same memory bank by another operand or by a resultant. Therefore, it is actually only necessary to devote 31 minor cycles to a single memory bank while the other minor cycle may be used simultaneously for reading as well as for addressing.

With respect to the diagram of FIG. 3A, let it be assumed that the line denoted A is at a fixed location and that as the memory cycles, the circle representing the memory locations rotates clockwise in the direction of arrows 70. Thus, upon completion of four minor cycles of the computer, the position of the circle in FIG. 3A will have rotated such that position A + 8 is at the top of the circle adjacent line A.

As shown in FIG. 3B, until the A operands commence reading from the ninth bank of the memory, and the first operands $A_1$ through $A_{64}$ are completely read from banks 1 through 8, access may not be had to memory bank 1 for the B operands. In an ideal situation, such as shown in FIG. 3B, the physical location of the B operands commence with bank 9 of the computer. Thus, and with reference to FIG. 3B, A operands $A_1$ through $A_8$ would be read from bank 1 while B operands $B_1$ through $B_8$ would be simultaneously read from bank 9. Upon completion of the first major cycle, operands $B_1$ through $B_{64}$ have been read from banks 9–16 and the read circuits would be free to read A operands (e.g. $A_{65}$) from bank 9 and B operands (e.g. $B_{65}$) from bank 17.

However, should the A and B operands occupy the same bank of the memory one of the operand vectors is not read and the other operand vector, such as A, is continuously stored and buffered in the apparatus shown in FIG. 2. Thus, if A operands arrive first, two operands representing operands $A_1$ and $A_2$ are stored in register 28, two operands representing operands $A_3$ and $A_4$ are stored in register 26, two operands $A_5$ and $A_6$ are stored in buffer 17, and the remaining operands $A_7$ through $A_{64}$ are stored in buffer 38. (It will be noted from the foregoing that although operands are initially stored in buffer 17, upon processing through fan-in circuit 15, all further operands are buffered through buffer 38.) Thereafter, as shown particularly in FIG. 3C, when the first major cycle of the memory has been completed, and up to eight A swords (operands $A_1$ through $A_{64}$) have been buffered, the read circuits continue to read the next A operands $A_{65}$, etc. from the ninth bank of the memory while the first bank is accessed to read B operands. Therefore, upon completion of the next four minor cycles of the computer memory, nine swords (operands $A_1$ through $A_{72}$) have been read from banks 1 through 9 and one sword (operands $B_1$ through $B_8$) have been read from bank 1. With the $B_1$ operand having been read, d operands $A_1$ and $B_1$ may be forwarded on to the calculator portions. After the first A operand has been forwarded to the calculator, the following operands are moved up one position in the buffer.

Referring particularly to FIG. 3D, assume that the A and B operand vectors commence at different banks in the memory, with the B vector lagging the A vector by three banks. Particularly, if the A operands commence at bank 3 while the B operands commence at bank 1, under such circumstances the first A operands (operands $A_1$ through $A_{16}$) are read from banks 3 and 4 of the memory and B operands $B_1$ through $B_{16}$ are read from banks 1 and 2. During the next four minor cycles of the memory, a sword (operands $A_{17}$ through $A_{24}$) is read, but since the read circuits cannot read $B_{17}$, $B_{17}$ et seq. are temporarily skipped and the A sword ($A_{17}$ through $A_{24}$) is buffered. The process continues as heretofore described until $A_{17}$ and $A_{18}$ occupy register 28, $A_{19}$ and $A_{20}$ occupy register 26 and $A_{21}$ and $A_{22}$ occupy buffer 17 as heretofore described. $A_{23}$ through $A_{80}$, which are read during the first major cycle commencing with the third bank, are then forwarded through fan-in circuit 19 to buffer 38. Thus, the B line is shifted to position B' to essentially the same condition shown in connection with FIGS. 3B and 3C. During the next four minor cycles of the computer, the read circuits associated with the memory continue to read A operands from the eleventh bank of the memory while simultaneously reading B operands $B_{17}$, etc. from the third bank of the memory. Thus, the $B_{17}$ through $B_{24}$ operands are read from memory and sequentially forwarded via channel 23 and register 33 to the data interchange while simultaneously A operands $A_{81}$ through $A_{88}$ are read from memory and stored in buffer 38. The data interchange connected to channels 29 and 34, being ready to accept the $A_{17}$ and $B_{17}$ operands stored in registers 28 and 33, respectively, processes that data thereby permitting $A_{18}$ and $B_{18}$ to be next in line for processing. The process continues for the next four minor cycles until operands are cleared from buffer 17, and thereafter, data is read from buffer 38 as heretofore described.

Figure 4A:
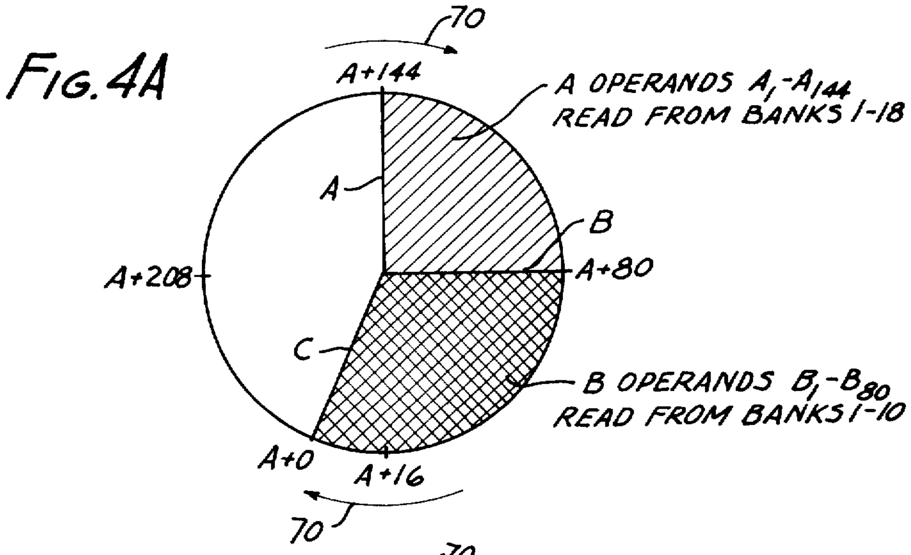
FIGS. 4A–4D are graphical representations illustra-e of the operation of the buffering control apparatus own in FIG. 2 for channeling resultant vectors from e calculator portions to memory.

As the A and B operands are processed by the calculator portion of the computer, C resultants are formed and are channeled back from the data interchange via channel 51 to register 50. In the event that the first C resultants arrive at a time when either the A or B operands are being read from the same group of memory banks, a conflict occurs and it is desirable to buffer the C resultants to a convenient time before re-entry to the memory via the storage access control. Thus, the C resultants are forwarded to register 50 from the data interchange and thence to gate 53. With reference particularly to FIG. 4A, the simplest case for writing C resultants into memory may be explained. In the case of the situation diagrammatically illustrated in FIG. 4A, the A operands $A_1$ through $A_{144}$ have been read from banks 1 through 18. Likewise, the B operands $B_1$ through $B_{80}$ have been read from banks 1 through 10. Consequently, when the first C resultant arrives at register 50, the first eight memory banks are free, since A operands are being read from the ninteenth bank while B operands are being read from the eleventh bank. Further, since the time of occurrence of arrival of the C resultants occurs during the third quadrant of the diagram illustrated in FIG. 4A, no conflict will occur when the A operands move through the major cycle. As a result, the resultant C data is forwarded to buffer 61 and a signal from the storage access control, indicating that the first bank is free to receive the resultant data, is imposed on channel 54 to gate 53 to operate fan-in circuit 56 to operate write register 58 to insert the resultant data to memory via channel 59 and the storage access control.

Figure 4B:
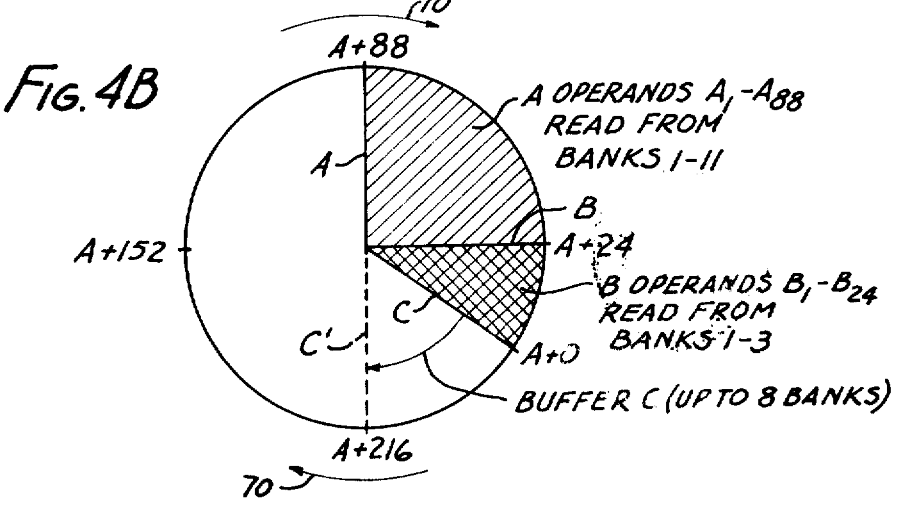

However, a conflict would arise if the first C resultants arrived at a time when the first memory banks into which the C resultants are to be stored is still reading operands. For example, and as shown in FIG. 4B, A operands $A_1$ through $A_{88}$ have been read from banks 1 through 11 while B operands $B_1$ through $B_{32}$ have been read from banks 1 through 3. Therefore, and with reference to FIG. 1, the first memory bank cannot be accessed until completion of the major cycle, and completion of reading B operands $B_{25}$ through $B_{64}$ from banks 4 through 8. Therefore, C resultants must be buffered until that memory cycle is completed. As a result, a signal from the storage access control via channel 54 imposed on fan-in circuit 56 advises the circuit that banks 1 through 8 cannot be accessed thereby causing the C resultant data to be buffered in buffer 61. Buffer 61 is capable of storing up to sixteen swords of data (128 resultants). In this case, where the C resultants arrive during the second quadrant of the diagram illustrated in FIG. 4B, buffer 61 stores up to eight swords of C resultants (64 resultants). Simultaneously, counter 62 is operated to count the number of resultant swords stored in buffer 61 for purposes to be hereinafter explained. Upon completion of the reading of B operands from the first bank of the memory, up to eight C resultant swords (64 resultants) have been stored in buffer 61. (In the case illustrated in FIG. 4B, since the C resultants arrived at a time when three B operand swords have been read from banks 1 through 3, only five C resultant swords will be stored in buffer 61.) When the first bank of the memory is freed, the storage access control operates fan-in circuit 56 via channel 54 to permit the channeling of resultant data from buffer 61 to write register 58 to permit continuous channeling of resultant data into memory. Further C resultants are continuously buffered in buffer 61.

Figure 4C:
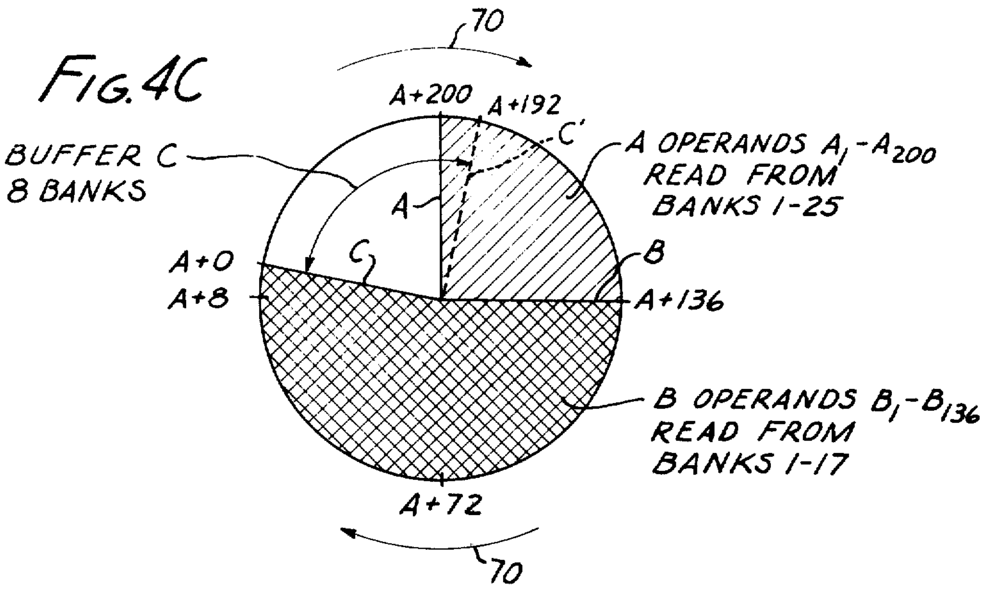
Figure 4D:
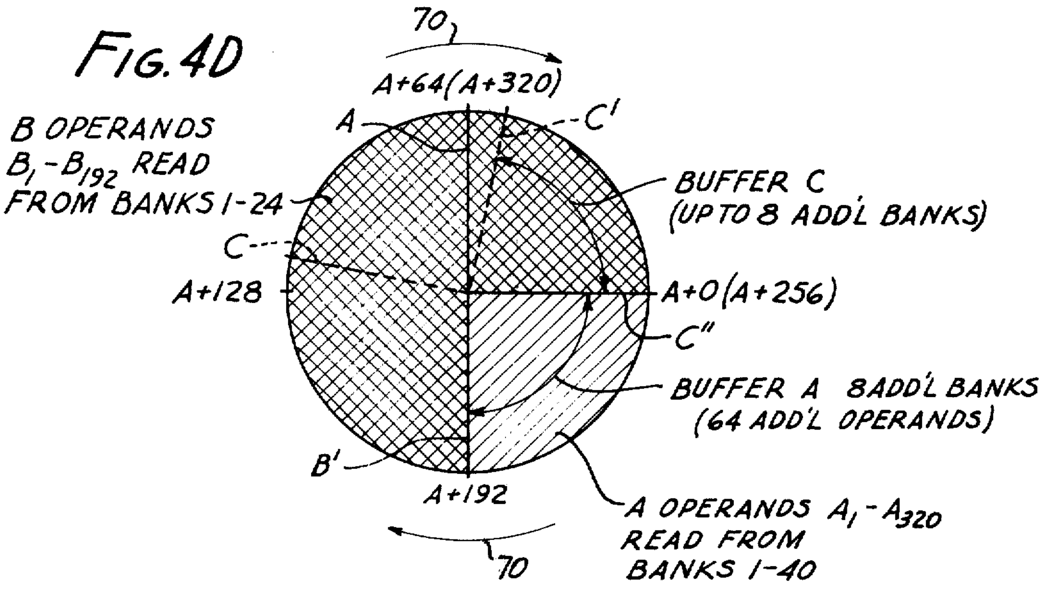

FIGS. 4C and 4D taken together, illustrate the "worst" case involving C resultant data being returned to memory. In this case, A operands $A_1$ through $A_{200}$ have been read from the first twenty five banks of the memory while B operands $B_1$ through $B_{136}$ have been read from the first seventeen banks of the memory. Therefore, the first bank of the memory is seemingly free to accept C resultant data. However, the addressing circuits of the read and write portion of the memory are such that every thirty-second bank utilizes the same addressing circuits. Therefore, since the C resultant data arrives during the fourth quadrant or major cycle as indicated in FIG. 4C, a conflict will arise when the read circuits commence reading A operands from the thirty-third memory bank, since reading from the thirty-third bank and writing into the first memory bank cannot be accomplished simultaneously. As a result, the storage access control forwards a signal via channel 54 to fan-in circuit 56 so that the first C resultant data is stored in buffer 61. Thus, as in the case illustrated in FIG. 4B, the C resultant data is continuously stored in buffer 61. Counter 62, as heretofore explained, provides a count indicating the number of resultant swords stored in buffer 61. When that count reaches 8, indicating eight swords of resultants stored in buffer 61, (diagrammatically illustrated as the dashed line C' in FIG. 4C, counter 62 provides an enable signal via channel 64 to control 44 to further buffer the A operands. The reason for this is that if the C operands commence writing at the point illustrated by the dashed line C' in FIG. 4C, a conflict will arise with the B operands reading from the third quadrant of the memory. Further, if the C resultants are buffered an additional eight swords, a conflict will arise upon reading of the fourth quadrant B operands.

Two approaches may be considered. First, the C resultants could be buffered up to three full memory cycles (24 banks) to the condition illustrated in FIG. 4B. This alternative, however, is not particularly desirable as undue delays may occur in the utilization of the resultants as well as overburdening the size of buffer 61. Consequently, a second alternative is considered more desirable by which the counter 62, upon reaching a count of 8 and the resultants cannot yet be forwarded to the write registers, operates control 44 to further buffer the A operands an additional 8 swords (8 banks, 64 operands). Therefore, and as illustrated in FIG. 4D, the A operands are continuously read from the memory, but up to sixteen full swords (128 operands) of A operands are stored in buffer 38. Meanwhile, the reading of the B operands is temporarily halted for one major cycle of the memory (64 operands) and the C resultants are buffered up to an additional seven resultant swords (56 resultants) in buffer 61 until the condition illustrated in FIG. 4D is reached. Thus, A operands are read at line A, B operands are read at line B' and C resultants are processed at line C''. Therefore, the C resultants are buffered up to sixteen full memory banks and the A operands are likewise buffered up to sixteen full memory banks. In this case, therefore, A operands $A_1$ through $A_{320}$ have been read from the first forty banks of the memory, B operands $B_1$ through $B_{196}$ have been read from the first twenty-four banks of the memory. Therefore, during the next four minor cycles of the computer, A operands $A_{321}$ through $A_{328}$ will be read from the forty-first memory bank, B operands $B_{197}$ through $B_{204}$ will be read from the twenty-fifth memory bank and C resultants $C_1$ through $C_8$ will be read into the first memory bank in a nonconflicting manner.

It will be appreciated that most arithmatic processing of the operands can be accomplished by the calculator portions of the computer in a time equivalent to a few minor cycles of a bank. Therefore, if the resultants are to be stored in the same banks as the operands, commencing with the first such bank, the condition illustrated in association with FIG. 4B is likely to occur. However, it is also likely that the resultants will be stored in subsequent banks, in which case the conditions illustrated in association with FIG. 4A and FIGS. 4C and 4D may occur.

Although it is not necessary to the understanding of the present invention, it should be noted from FIG. 4D that the A, B and C lines appear at division lines between three of the four quadrants. Input/output controls can be accessed in a non-conflicting manner utilizing suitable buffering techniques to provide I/O access at the fourth division line between quadrants (at A + 218 in FIG. 4D or A + 152 in FIG. 4B).

The present invention thus provides apparatus for continuously reading data from the memory portions of the computer for computation by the calculator portions of the computer and for writing resultants into the memory portion of the computer from the calculator portion. The apparatus operates with minimal pre-set delays, and once the buffering is established, no further delays need by established. Thus, the invention eliminates the necessity of adding additional delays during successive operations of the computer. Instead, pre-set delays are established at the beginning or near the beginning of each stream in accordance with the optimal operation and system timing of the computer.

One feature of the present invention resides in the fact that buffering is accomplished at rates independent of data access. Thus, in situations involving "short" vectors (i.e. ones having operands less than about 48 operands) no buffering need be accomplished since the later arriving operands occur upon completion of the first operands. Further, if gaps appear in the data, the buffer can resynchronize itself to the most optimum handling of the vectors. Also, in "medium" length vectors (i.e. those having less than about 320 operands), further optimizing is accomplished through release oi control paths, as heretofore described.

With apparatus according to the present invention, it is possible to handle large vectors representing operands and resultants between the memory and calculator portions of the computer without introducing serious delays as heretofore known in the prior art.

This invention is not to be limited by the embodiment shown in the drawings and described in the description, which is given by way of example and not of limitation, but only in accordance with the scope of the appended claims:

What is claimed is:

1. Apparatus for channeling data between the memory and calculator portions of a computer wherein the memory contains a first vector comprising a plurality of successive first operands and a second vector comprising a plurality of succesive second operands, said memory comprising a plurality of successively accessible banks at least some of which contain said first vector and at least some of which contain said second vector, at least certain of said banks containing some operands of both said first and second vectors, said memory being of a class capable of accessing operands of one of said first and second vectors from one bank while accessing operands of the other of said first and second vectors from another bank, said apparatus comprising: first read means for successively reading first operands from said memory; second read means for successively reading second operands from said memory; first buffer means selectively operable to store successive ones of either said first operands or said second operands; first control means responsive to the initial operand of that one of said first and second vectors having earlier arriving initial operand at the respective first or second read means to operate said first buffer means to store successive operands of said one vector; said first control means being further responsive to the initial operand of the other of said first and second vectors at the respective first or second read means to operate said first buffer means to release successive operands of said one vector; first output means associated with said first read means and said first buffer means for channeling successive first operands to said calculator portion, and second output means associated with said second read means and said first buffer means for channeling successive second operands to said calculator portion, whereby corresponding first and second operands are simultaneously channeled to said calculator portion in consecutive ordered streams by said first and second output means.

2. Apparatus according to claim 1 wherein said first output means includes first register means capable of storing a predetermined number of first operands and said second output means includes second register means capable of storing a predetermined number of second operands, said first and second register means each being operable to provide a first control signal representative of a condition that the respective register has stored said predetermined number of operands, said first control means being operable in response to said first control signal to condition said first buffer means to store further operands of said one vector.

3. Apparatus according to claim 2 wherein said first and second register means are first-in, first-out registers.

4. Apparatus according to claim 2 wherein said fur-er operands stored in said first buffer means are suc-:ssively transferred on a first-in, first-out basis to said )erated register means as operands are forwarded om said operated register means to said calculator )rtion.

5. Apparatus according to claim 4 wherein said first ıd second register means are first-in, first-out regis-rs.

6. Apparatus according to claim 1 whereby an output om the calculator portion is in the form of a third vec-ır comprising a plurality of successive resultants for orage in said memory, said memory being of a class ıpable of simultaneously writing resultants into a dif-rent bank from which it is accessing operands, said )paratus further including receiver means for receiv-g successive resultants from said calculator portions; :cond buffer means for storing resultants; write means )erable by said memory to write successive resultants om said second buffer means into successive desig-ated banks of said memory; said memory operating ıid write means when the bank designated for storage f resultants would not be simultaneously accessed by ne of said first and second read means.

7. Apparatus according to claim 6 further including )unter means providing a count indicative of the num-er of resultants stored in said second buffer means, ıid first control means being operable in response to predetermined count from said counter means indica-ve that said second buffer means contains a predeter-ıined number of resultants to operate said first buffer ıeans to store additional operands.

8. Apparatus for simultaneously processing operands f a first vector in the form of $A_1$, $A_2$, $A_3$ . . . $A_n$ and op-rands of a second vector in the form of $B_1$, $B_2$, $B_3$ . . $B_n$ transmitted from the memory to the calculator por-ıons of a computer, wherein the first and second vec-)rs each contain a finite number of operands, and /herein $A_1$, $A_2$, $A_3$, . . . and $A_n$ each represent individ-al successive first operands of said first vector and $B_1$, $B_2$, $B_3$, . . . and $B_n$ each represent individual successive econd operands of said second vector, said apparatus omprising: input means for receiving said first and sec-ınd vectors in respective first and second consecutively ırdered operand streams; first aligning means con-ıected to said input means for aligning said first and econd operands streams to forward operand pairs $A_1$ ınd $B_1$, $A_2$ and $B_2$, $A_3$ and $B_3$ . . . $A_n$ and $B_n$ to an output neans, said first aligning means including buffer means or storing operands, and control means responsive to he first arriving of the $A_1$ and $B_1$ operands received by aid input means for selectively controlling said buffer means to store operands of the respective vector associated with said first arriving operand, said buffer means consecutively supplying the stored operands to said output means upon arrival of the corresponding consecutively ordered operands of the other vector at said input means and forwarding thereof to said output means; said output means being connected to said calculator portion to consecutively forward said operand pairs to said calculator portion.

9. Apparatus according to claim 8 further including receiver means for receiving an output in the form of a resultant vector from said calculator portion in a consecutively ordered resultant stream, said resultant vector being in the form of $C_1$, $C_2$, $C_3$, . . . $C_n$, wherein $C_1$, $C_2$, $C_3$, . . . and $C_n$ each represent an individual resultant of said vector, second buffer means connected to said receiver means for storing resultants, said second buffer means having an output and second control means operable to control said second buffer means to store a predetermined number of resultants.

10. Apparatus according to claim 9 wherein said computer includes a memory having a plurality of banks containing said first and second vectors, said input means being connected to said memory, the output of said buffer means being connected to said memory so that resultants may be stored in at least some of said banks, said memory providing an inhibit signal indicative of which banks are not accessible for storing resultants, and said control means being responsive to said inhibit signal to cause said buffer means to store resultants destined for storage in the unaccessible bank.

11. Apparatus according to claim 9 further including means associated with said second buffer means to operate said first-named control means to cause said first-named buffer means to store additional operands when a predetermined number of resultants are stored in said second buffer means.

12. Apparatus according to claim 11 wherein said computer includes a memory having a plurality of banks containing said first and second vectors, said input means being connected to said memory, the output of said second buffer means being connected to said memory so that resultants may be stored in at least some of said banks, said memory providing an inhibit signal indicative of which banks are not accessible for storing resultants, and said second control means being responsive to said inhibit signal to cause said second buffer means to store resultants destined for storage in the unaccessible banks.

* * * * *